(12) United States Patent
Sanchez Rola et al.

(10) Patent No.: US 12,229,317 B1
(45) Date of Patent: Feb. 18, 2025

(54) SYSTEMS AND METHODS FOR PROTECTING USER DATA PRIVACY AGAINST WEB TRACKING ON WI-FI CAPTIVE PORTALS

(71) Applicant: GEN DIGITAL INC., Tempe, AZ (US)

(72) Inventors: Iskander Sanchez Rola, Antibes (FR); Christopher Gates, Mountain View, CA (US)

(73) Assignee: GEN DIGITAL INC., Tempe, AZ (US)

( * ) Notice: Subject to any disclaimer, the term of this patent is extended or adjusted under 35 U.S.C. 154(b) by 170 days.

(21) Appl. No.: 17/816,624

(22) Filed: Aug. 1, 2022

(51) Int. Cl.
| | |
|---|---|
| G06F 21/62 | (2013.01) |
| H04L 9/40 | (2022.01) |
| H04L 67/02 | (2022.01) |
| H04L 67/50 | (2022.01) |

(52) U.S. Cl.
CPC ...... G06F 21/6263 (2013.01); H04L 63/1408 (2013.01); H04L 67/02 (2013.01); H04L 67/535 (2022.05)

(58) Field of Classification Search
CPC ... H04L 67/02; H04L 67/535; H04L 63/1408; G06F 21/6263
See application file for complete search history.

(56) References Cited

U.S. PATENT DOCUMENTS

| | | | | |
|---|---|---|---|---|
| 11,233,802 B1* | 1/2022 | Rudeanu | ............. | H04L 63/0435 |
| 2012/0210011 A1* | 8/2012 | Liu | ..................... | H04W 12/082 |
| | | | | 709/229 |
| 2017/0126627 A1* | 5/2017 | Yang | ....................... | H04L 63/20 |
| 2020/0133815 A1* | 4/2020 | Gaonkar | ............. | G06F 11/3495 |
| 2020/0162517 A1* | 5/2020 | Wong | ................... | H04L 63/0236 |
| 2020/0302413 A1* | 9/2020 | Moiseenko | ............. | H04L 63/10 |
| 2020/0394332 A1* | 12/2020 | Jakobsson | ......... | G06F 16/24573 |
| 2021/0392576 A1* | 12/2021 | Ergen | ................ | H04M 15/8038 |
| 2022/0147840 A1* | 5/2022 | Zotto | ..................... | G06F 17/40 |
| 2022/0210194 A1* | 6/2022 | Parekh | .................... | H04L 67/10 |
| 2022/0337562 A1* | 10/2022 | Sonawalla | .......... | G06F 21/6245 |
| 2024/0015064 A1* | 1/2024 | Gates | ..................... | H04L 41/50 |

* cited by examiner

*Primary Examiner* — Dao Q Ho
(74) *Attorney, Agent, or Firm* — Greenberg Traurig, LLP

(57) ABSTRACT

The disclosed computer-implemented method for protecting user data privacy against web tracking on Wi-Fi captive portals may include (i) detecting telemetry data generated from establishing a connection with a network access device associated with a captive portal, (ii) determining, based on the telemetry data, a target set of domains associated with a service set identifier assigned to the network access device, (iii) analyzing web tracking behavior data associated with the target set of domains to identify web trackers on the captive portal for a dataset of potential users, (iv) calculating a privacy risk score associated with the web trackers on the captive portal, and (v) performing a security action that protects against a potential invasion of user data privacy by presenting a privacy risk score notification associated with the web trackers on the captive portal. Various other methods, systems, and computer-readable media are also disclosed.

20 Claims, 7 Drawing Sheets

SYSTEMS AND METHODS FOR PROTECTING USER DATA PRIVACY AGAINST WEB TRACKING ON WI-FI CAPTIVE PORTALS

BACKGROUND

Numerous computer users often utilize public network access points (i.e., Wi-Fi hotspots) that provide wireless network connections for accessing the Internet when they are unable to connect to home and/or business private networks (i.e., due to travel, connectivity issues, etc.). Hotspots, which may often be located in high-traffic locations such as hotels, restaurants, coffeehouses, airports, and other public locations, provide Internet access through web browser landing pages known as captive portals. A captive portal may consist of a web page displayed to newly connected hotspot users that requests authentication credentials, a network access payment, and/or acceptance of end-user license agreements, prior to granting broader access to the public Internet.

However, captive portals, while serving as a gateway for users to access the Internet when they are aware from private home/business networks, may also present a number of privacy concerns for users conducting web browsing activities when connected to public Wi-Fi hotspots. For example, unlike private networks utilizing consumer or enterprise installed security software for detecting potential threats such as web tracking, hotspots hosting captive portals often only provide security-related statistics regarding certain activity (e.g., content manipulation, DNS spoofing, SSL stripping, and the like), while failing to disclose privacy (e.g., web-tracking) practices.

SUMMARY

As will be described in greater detail below, the present disclosure describes various systems and methods for protecting user data privacy against web tracking on Wi-Fi captive portals.

In one example, a method for protecting user data privacy against web tracking on Wi-Fi captive portals may include (i) detecting, by one or more computing devices, telemetry data generated from establishing a connection with a network access device associated with a captive portal, (ii) determining, by the one or more computing devices and based on the telemetry data, a target set of domains associated with a service set identifier assigned to the network access device, (iii) analyzing, by the one or more computing devices, web tracking behavior data associated with the target set of domains to identify web trackers on the captive portal for a dataset of potential users, (iv) calculating, by the one or more computing devices, a privacy risk score associated with the web trackers on the captive portal, and (v) performing, by the one or more computing devices, a security action that protects against a potential invasion of user data privacy by presenting a privacy risk score notification associated with the web trackers on the captive portal.

In some examples, the telemetry data may be detected by (i) detecting a user connection to the network access device and (ii) storing connection data and a corresponding timestamp received from the network access device as the telemetry data. In some examples, the target set of domains may be determined by (i) detecting a candidate set of domains in post-connection data requests to the service set identifier, (ii) filtering highly-accessed domains and domains externally loaded by third party resources from the candidate set of domains, and (iii) grouping one or more remaining domains in the candidate set of domains by another service set identifier for a wireless network utilized by another network access device to determine the target set of domains.

In some examples, the web tracking behavior data associated with the target set of domains may be analyzed by (i) communicating a query for on-demand telemetry detected by a web tracking service, (ii) receiving, in response to the query, a group of web tracking behaviors exhibited by a candidate list of web trackers based on the on-demand telemetry, and (iii) classifying a set of the candidate list of web trackers appearing to a threshold number of the potential users as the web trackers. In some examples, the query may include the target set of domains, a group of locations (i.e., user locations), and a timespan.

In some examples, the privacy risk score may be calculated by (i) determining a risk value for each of the web trackers based on the web tracking behavior data and (ii) generating the privacy risk score based on a number of the web trackers sharing a common risk value. In other examples, the privacy risk score may be calculated based on adding the captive portal to a cluster comprising a set of active portal groups. In these examples, each of the captive portal groups may be classified based on sharing a common privacy risk score. In some examples, the security action may include (i) displaying a visual indicator (e.g., utilizing a color scheme) corresponding to the privacy risk score and (ii) generating a warning (e.g., a notification) describing web tracking behavior associated with the web trackers.

In one embodiment, a system for protecting user data privacy against web tracking on Wi-Fi captive portals may include at least one physical processor and physical memory that includes computer-executable instructions and a set of modules that, when executed by the physical processor, cause the physical processor to (i) detect, by a detection module, telemetry data generated from establishing a connection with a network access device associated with a captive portal, (ii) determine, by a determining module and based on the telemetry data, a target set of domains associated with a service set identifier assigned to the network access device, (iii) analyze, by an analysis module, web tracking behavior data associated with the target set of domains to identify web trackers on the captive portal for a dataset of potential users, (iv) calculate, by a risk score module, a privacy risk score associated with the web trackers on the captive portal, and (v) perform, by a security module, a security action that protects against a potential invasion of user data privacy by presenting a privacy risk score notification associated with the web trackers on the captive portal.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect telemetry data generated from establishing a connection with a network access device associated with a captive portal, (ii) determine, based on the telemetry data, a target set of domains associated with a service set identifier assigned to the network access device, (iii) analyze web tracking behavior data associated with the target set of domains to identify web trackers on the captive portal for a dataset of potential users, (iv) calculate a privacy risk score associated with the web trackers on the captive portal, and (v) perform a security action that protects against a potential invasion of user data privacy by presenting a privacy risk score notification associated with the web trackers on the captive portal.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
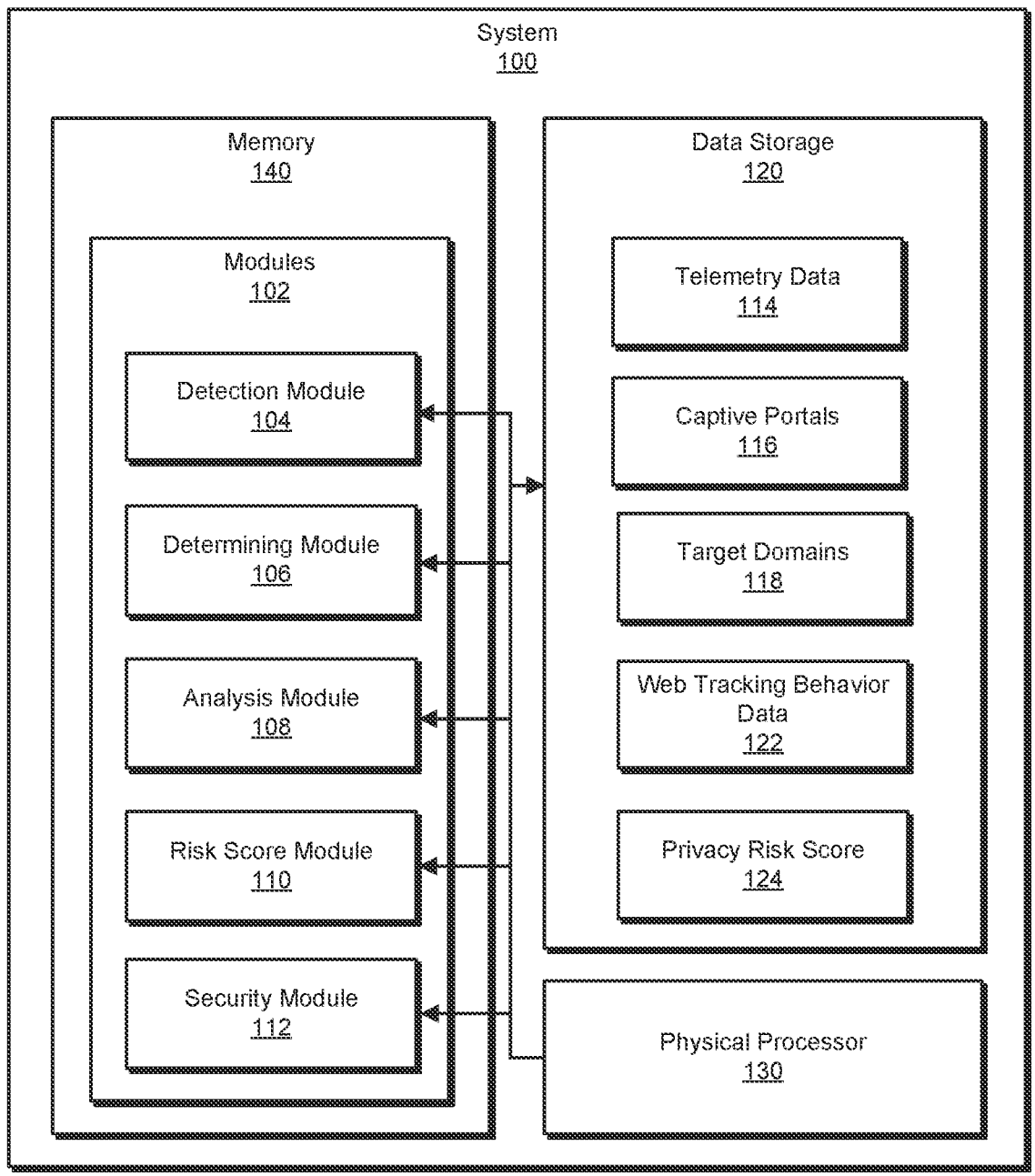
FIG. 1 is a block diagram of an example system for protecting user data privacy against web tracking on Wi-Fi captive portals.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting user data privacy against web tracking on Wi-Fi captive portals. As will be explained in greater detail below, by examining Wi-Fi connection telemetry data generated by wireless access points when a user connects to a hotspot, the systems and methods described herein may detect domains identifying captive portals (e.g., by identifying domains that are frequently present following user connections to a certain basic service set identifier (BSSID)). Furthermore, upon identifying the captive portal domains, the systems and methods described herein may access collected on-demand data privacy telemetry to identify web tracking behaviors detected for the captive portal domains to detect a number of associated web trackers.

Finally, the systems and methods described herein may determine a captive portal privacy score based on the number of web trackers and the level of risk (i.e., high, medium, or low) associated with each web tracker. By determining data privacy risks for captive portals in this way, the systems and methods described herein may provide users with privacy risks associated with identified web trackers (i.e., utilizing a visual indicator to represent a level of risk associated with using a particular captive portal) as well as identifying specific tracking actions (e.g., fingerprinting) performed by web trackers. In addition, the systems and methods described herein may improve computer network security by alerting users to the presence of web trackers configured to obtain their private data during web browsing sessions initiated on captive portals, thereby enabling these users to avoid accessing these portals so that they may seek alternative access options for conducting web browsing activities while maintaining user data privacy.

Figure 2:
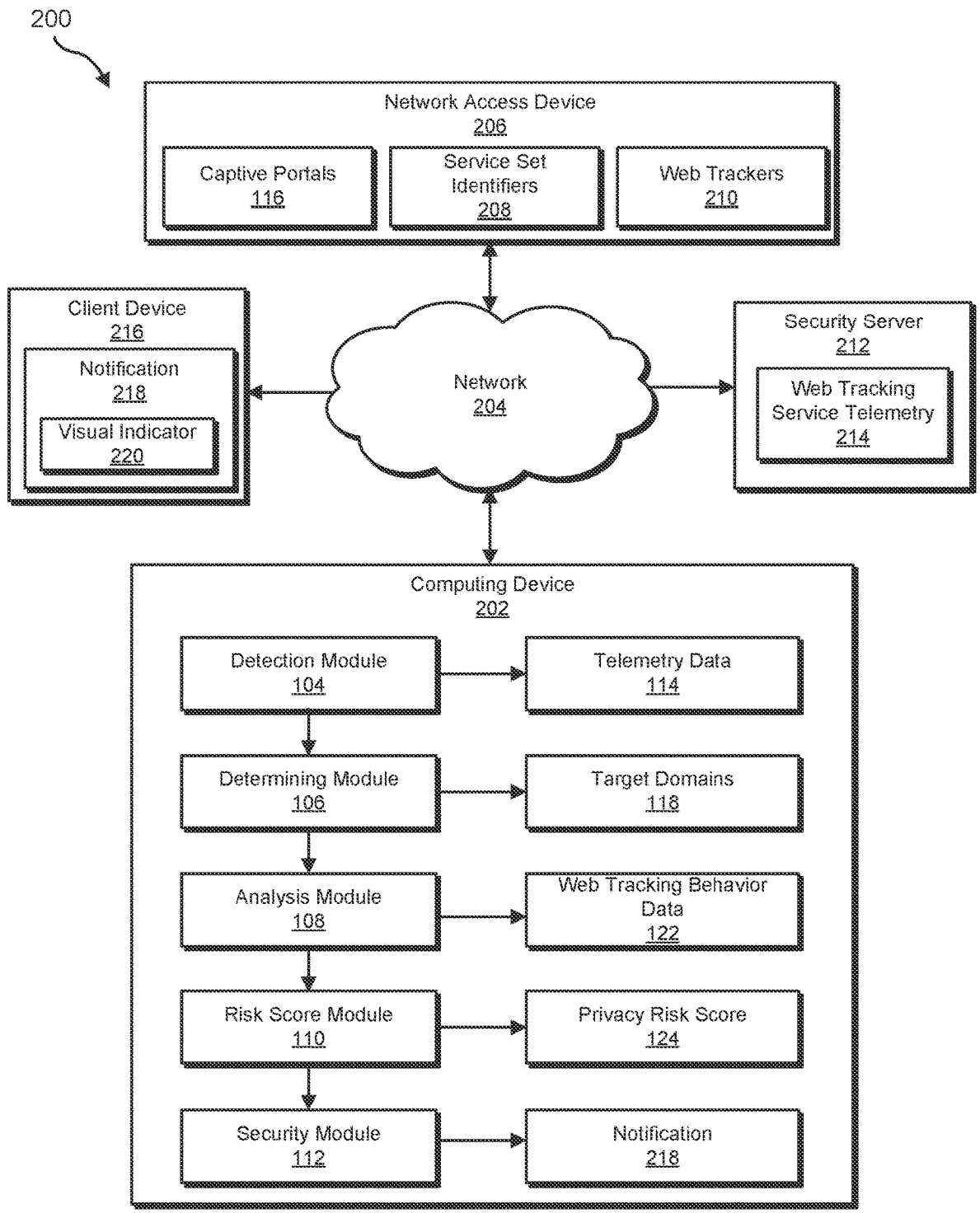
FIG. 2 is a block diagram of an additional example system for protecting user data privacy against web tracking on Wi-Fi captive portals.

The following will provide, with reference to FIGS. 1-2, detailed descriptions of example systems for protecting user data privacy against web tracking on Wi-Fi captive portals. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for protecting user data privacy against web tracking on Wi-Fi captive portals. As illustrated in this figure, example system 100 may include one or more modules 102 for performing one or more tasks. As will be explained in greater detail below, modules 102 may include a detection module 104 that detects telemetry data 114 generated from establishing a connection with a network access device associated with a captive portal 116. Example system 100 may additionally include a determining module 106 that determines, based on telemetry data 114, target domains 118 associated with a service set identifier assigned to the network access device. Example system 100 may also include an analysis module 108 that analyzes web tracking behavior data 122 associated with target domains 118 to identify web trackers on a captive portal 116 for a dataset of potential users. Example system 100 may additionally include a risk score module 110 that calculates a privacy risk score 124 associated with the web trackers on a captive portal 116. Example system 100 may also include a security module 112 that performs a security action that protects against a potential invasion of user data privacy by presenting a privacy risk score notification associated with the web trackers on a captive portal 116. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140.

Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting user data privacy against web tracking on Wi-Fi captive portals. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store telemetry data 114, data identifying captive portals 116, data identifying target domains 118, web tracking behavior data 122, and privacy risk score 124.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a network access device 206 (e.g., a hotspot), a security server 212, and a client device 216 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to protect user data privacy against web tracking on Wi-Fi captive portals.

For example, detection module 104 may detect telemetry data 114 generated from establishing a connection with network access device 206 associated with a captive portal 116. Then, determining module 106 may determine, based on telemetry data 114, target domains 118 associated with a service set identifier 208 assigned to network access device 206. Next, analysis module 108 may analyze web tracking behavior data 122 (e.g., by querying web tracking service telemetry 214 on security server 212) associated with target domains 118 to identify web trackers 210 on a captive portal 116 for a dataset of potential users associated with client devices (e.g., client device 216). Then, risk score module 110 may calculate privacy risk score 124 associated with web trackers 210 on a captive portal 116. Finally, security module 112 may perform a security action that protects against a potential invasion of user data privacy by presenting a privacy risk score notification (e.g., a notification 218 and/or a visual indicator 220 on client device 216) associated with web trackers 210 on a captive portal 116.

The term "captive portal," as used herein, generally refers to a web page accessed with a web browser that is displayed to newly connected users of a Wi-Fi hotspot before they are granted broader access to network resources (i.e., the Internet). In some examples, captive portals may be utilized to present a landing or log-in page which may require authentication, payment, acceptance of an end-user license agreement, acceptable use policy, survey completion, or other valid credentials that both the host and user agree to adhere by.

The term "web tracker," as used herein, generally refers to third-party executable program code loaded by a browser from external websites, that appears on web pages as content for viewing by a user. Upon being loaded by a browser, a web tracker may generate tracking data (e.g., an Internet tracking cookie) as well as access previous tracking data, saved by the browser, corresponding to a user's browsing activity on a website.

Computing device 202 generally represents any type or form of computing device capable of reading and executing computer-executable instructions. In some examples, computing device 202 may be a security server configured to perform threat protection services during web browsing activities, such as identifying and/or blocking web trackers. Additional examples of computing device 202 include, without limitation, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another. For example, computing device 202 may work and/or operate in conjunction with security server 212 that may be configured to store web tracking service telemetry 214.

Client device 206 generally represents any type or form of computing device capable of reading computer-executable instructions. In some examples, client device 206 may be an endpoint device running client-side security software. Additional examples of computing device 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202, network access device 206, security server 212, and client device 216. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
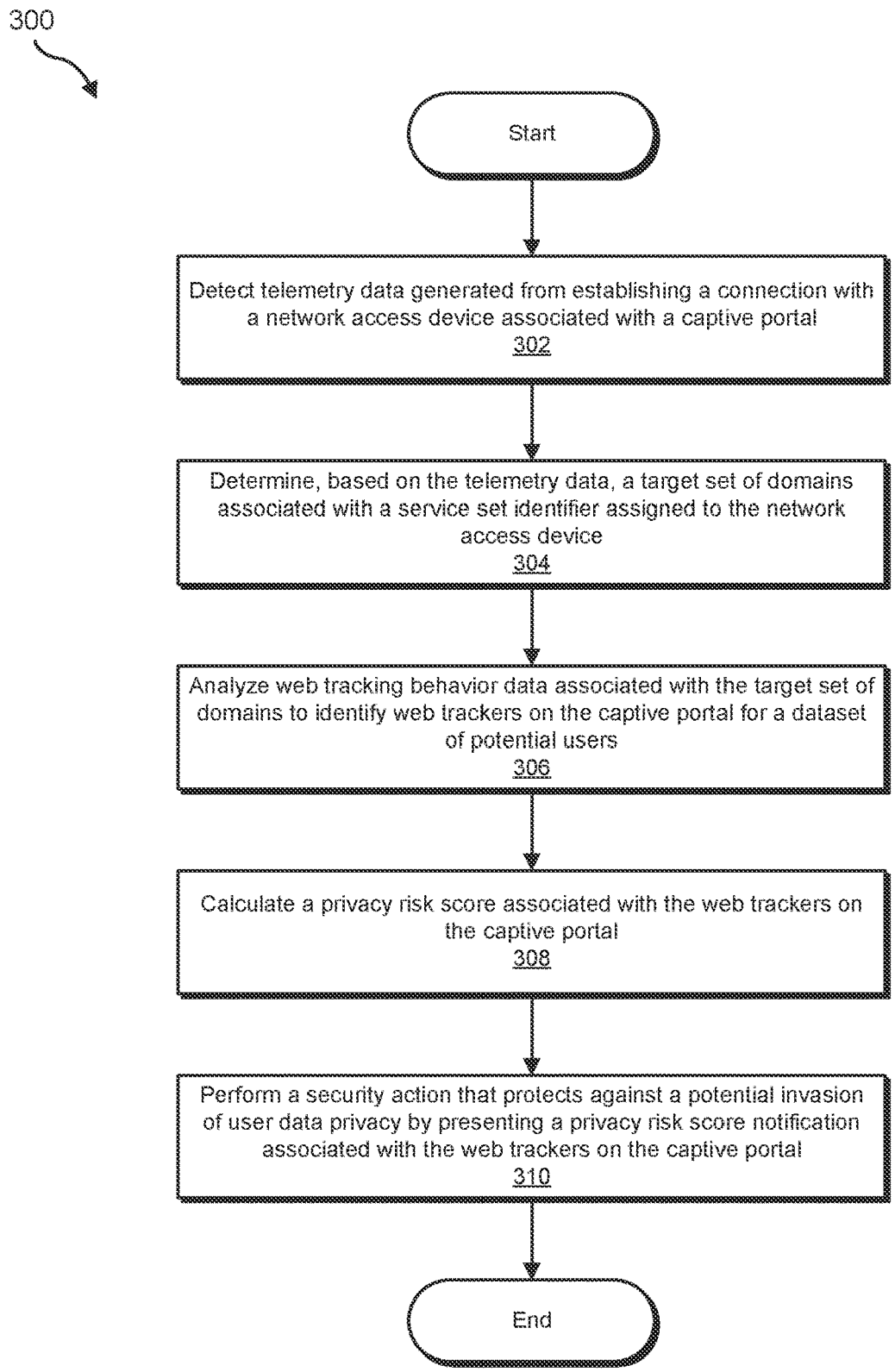
FIG. 3 is a flow diagram of an example method for protecting user data privacy against web tracking on Wi-Fi captive portals.

FIG. 3 is a flow diagram of an example computer-implemented method 300 for protecting user data privacy against web tracking on Wi-Fi captive portals. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect telemetry data generated from establishing a connection with a network access device associated with a captive portal. For example, detection module 104 may, as part of computing device 202 in FIG. 2, detect telemetry data 114 generated from establishing a connection with network access device 206 associated with a captive portal 116.

Detection module 104 may detect telemetry data 114 in a variety of ways. In some examples, detection module 104 may detect a user connection (e.g., a wireless connection initiated from client device 216) to network access device 206. Then, detection module 104 may store connection data and a corresponding timestamp received from network access device 206 as telemetry data 114.

At step 304, one or more of the systems described herein may determine, based on the telemetry data, a target set of domains associated with a service set identifier assigned to the network access device. For example, determining module 106 may, as part of computing device 202 in FIG. 2, determine target domains 118 associated with one or more service set identifiers 208 assigned to network access device 206.

Determining module 106 may determine target domains 118 in a variety of ways which will now be described with respect to FIG. 4 which shows a flow diagram of an example computer-implemented method 400. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

Figure 4:
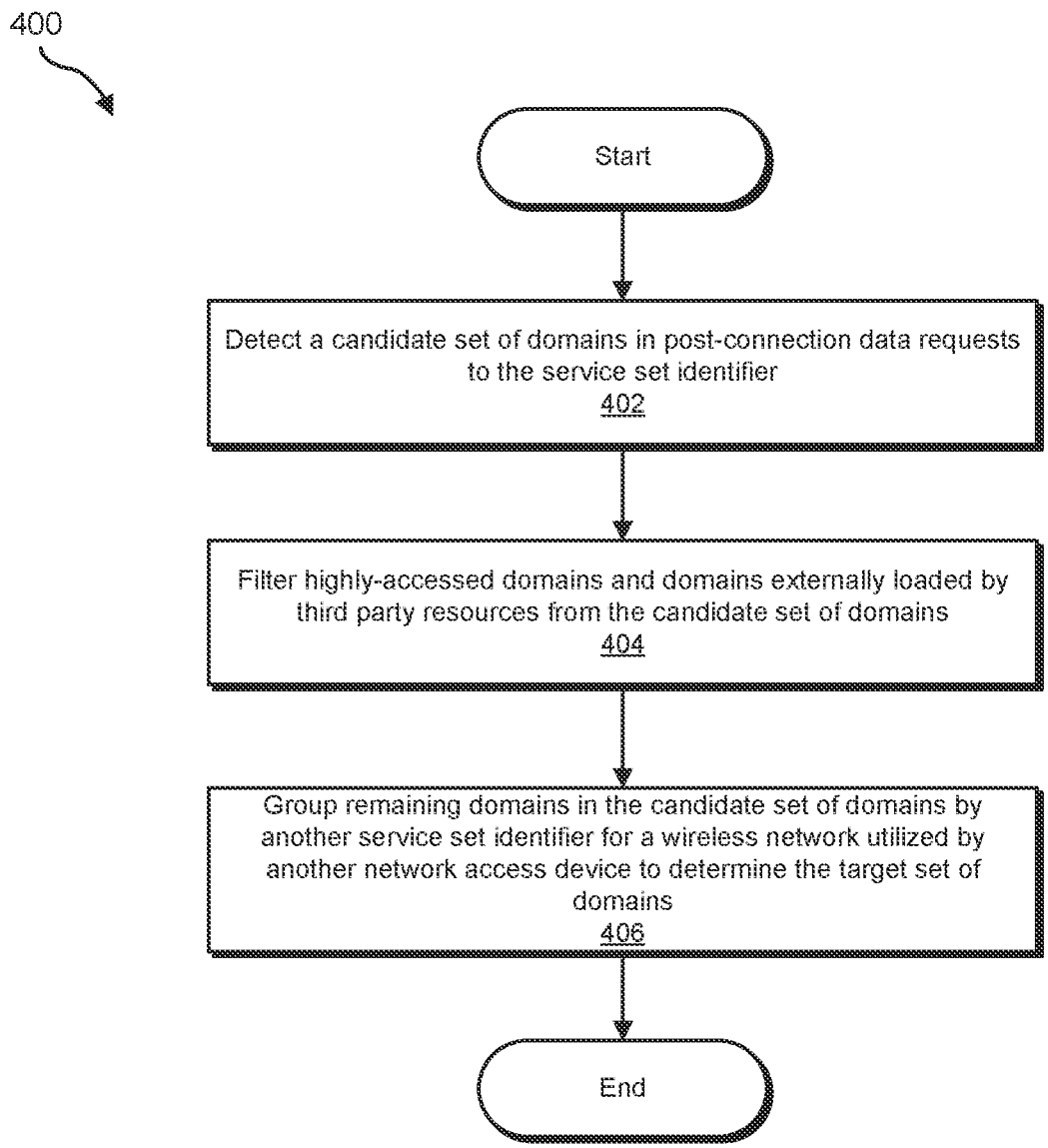
FIG. 4 is a flow diagram of an additional example method for protecting user data privacy against web tracking on Wi-Fi captive portals.

As illustrated in FIG. 4, at step 402 one or more of the systems described herein may detect a candidate set of domains in post-connection data requests to a service set identifier 208. For example, determining module 106 may, as part of computing device 202 in FIG. 2, check data requests from network access device 206 generated after connecting to a group of client devices, the basic service set identifier (i.e., the BSSID or MAC address) assigned to network access device 206, and the extended service set identifier (ESSID) assigned as the name of the wireless network utilized by network access device 206. Then determining module 106 may detect a set of domains requested after connections for a group of customers (e.g., the first ten client device connections) to a certain BSSID. Upon detecting that a group of certain domains are present in most cases (e.g., 90% of the time), determining module 106 may identify these highly-accessed domains as the candidate set of domains.

At step 404, one or more of the systems described herein may filter highly-accessed domains and domains externally loaded by third party resources from the candidate set of domains. For example, determining module 106 may, as part of computing device 202 in FIG. 2, remove domains from the candidate set of domains detected at step 402 (e.g., worldwide or per country domains) as well as externally loaded third-party resources.

At step 406, one or more of the systems described herein may group the remaining domains in the candidate set of domains by another service set identifier for a wireless network utilized by another network access device to determine the target set of domains. For example, determining module 106 may, as part of computing device 202 in FIG. 2, group a set of additional network access devices by their ESSID/SSID to account for situations where there are many Wi-Fi hotspots run by the same operator in different locations.

Returning now to FIG. 3, at step 306, one or more of the systems described herein may analyze web tracking behavior data associated with the target set of domains to identify web trackers on the captive portal for a data set of potential users. For example, analysis module 108 may, as part of computing device 202 in FIG. 2, analyze web tracking behavior data 122 to identify web trackers 210 on a captive portal 116.

Analysis module 108 may analyze web tracking behavior data 122 in a variety of ways which will now be described with respect to FIG. 5 which shows a flow diagram of an example computer-implemented method 500. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

Figure 5:
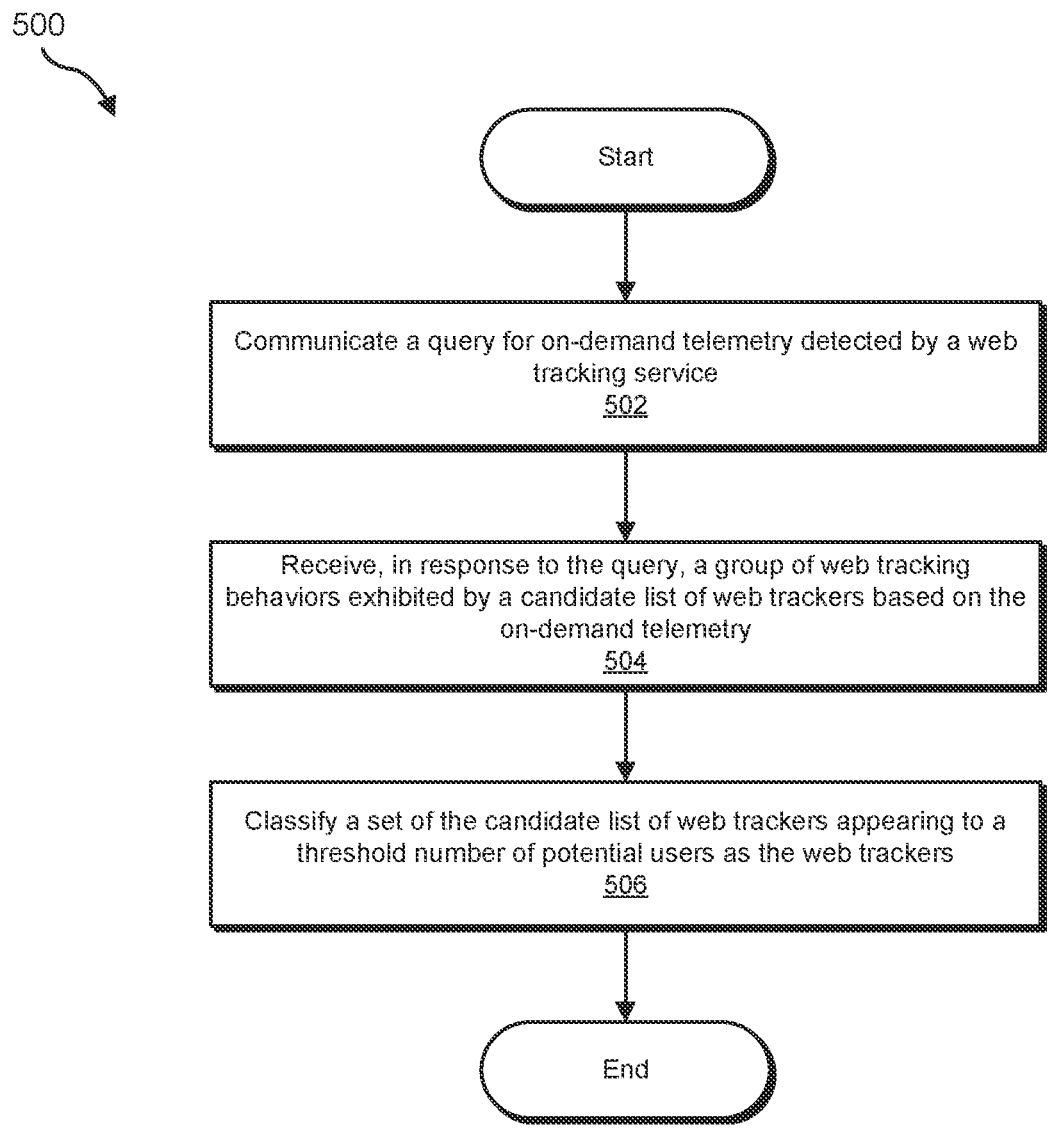
FIG. 5 is a flow diagram of an additional example method for protecting user data privacy against web tracking on Wi-Fi captive portals.

As illustrated in FIG. 5, at step 502 one or more of the systems described herein may communicate a query for on-demand telemetry detected by a web tracking service. For example, analysis module 108 may, as part of computing device 202 in FIG. 2, communicate a query for web tracking service telemetry 214 to security server 212 to check how a captive portal 116 is behaving regarding privacy/web tracking. In some examples, the query may include target domains 118, one or more locations associated with individuals accessing target domains 118, and a timespan.

At step 504 one or more of the systems described herein may receive, in response to the query, a group of web tracking behaviors exhibited by a candidate list of web trackers based on the on-demand telemetry. For example, analysis module 108 may, as part of computing device 202 in FIG. 2, receive web tracking behavior data 122 exhibited by web trackers 210 based on web tracking service telemetry 214.

At step 506 one or more of the systems described herein may classify a set of the candidate list of web trackers appearing to a threshold number of potential users as the web trackers. For example, analysis module 108 may, as part of computing device 202 in FIG. 2, only count (i.e., classify) web trackers 210 appearing to a majority of users (e.g., equal to or greater than 90%) of a captive portal 116.

Returning now to FIG. 3, at step 308, one or more of the systems described herein may calculate a privacy risk score associated with the web trackers on the captive portal. For example, risk score module 110 may, as part of computing device 202 in FIG. 2, calculate privacy risk score 124 associated with web trackers 210 on a captive portal 116.

Risk score module 110 may calculate privacy score 124 in a variety of ways. In some examples, risk score module 110 may determine a risk value for each of a number of web trackers 210 based on web tracking behavior data 122. Then, risk score module 110 may generate privacy risk score 124 based on which web trackers 210 share a common risk value.

In one example, risk score module 110 may assign numerical risk values corresponding to high-risk trackers (such as those performing browser fingerprinting of user browsing histories for the purpose of delivering targeted exploits), medium-risk trackers (such as cross-site cookies that collect user browsing histories for sending to third parties to deliver advertising), and low-risk trackers (such as Internet cookies designed to enable users to speed up website logins and save the contents of online shopping carts), based on web tracking behavior data 122. For example, risk score module 110 may assign a numerical value of 3 to high-risk trackers, a numerical value of 2 to medium-risk trackers, and a numerical value of 1 to low-risk trackers. Continuing with this example, risk score module 110 may then multiply the number of trackers for a captive portal 116 by the risk value determined for each tracker, to calculate privacy risk score 124. Thus, if a captive portal 116 has 4 high-risk trackers, its privacy risk score 124 would be 12 (i.e., 4 trackers multiplied by 3 which is the risk value for each high-risk tracker). In some examples, risk score module 110 may also cluster hotpots (i.e., captive portals on multiple network access devices) into groups based on their calculated privacy risk scores with upper outliers being classified as having the worst score (i.e., where the highest privacy risk score shared by a group corresponds to the highest tracker risk).

At step 310, one or more of the systems described herein may perform a security action that protects against a potential invasion of user data privacy by presenting a privacy risk score notification associated with the web trackers on the captive portal. For example, security module 112 may, as part of computing device 202 in FIG. 2, generate notification 218 on client device 216 that may include displaying visual indicator 220 corresponding to privacy risk score 124. In some examples, visual indicator 220 may utilize a color scheme to represent an associated privacy risk for a captive portal 116 (e.g., red for a portal having a score greater than 7, yellow for a portal having a score between 3 and 6, and green for a portal having a score between 1 and 3). In some examples, notification 218 may also include a warning describing web tracking behavior (such as fingerprinting) associated with web trackers 210 for a captive portal 116. In other examples, visual indicator 220 may utilize a color scheme to also represent web tracking behavior practices (e.g., orange for fingerprinting) for a captive portal 116.

As explained in connection with method 300 above, the systems and methods described herein provide for protecting user data privacy against web tracking on Wi-Fi captive portals. In particular, the systems and methods described herein may examine Wi-Fi connection telemetry data generated by wireless access points when a user connects to a hotspot to detect domains identifying captive portals (e.g., by identifying domains that are frequently present following user connections to a certain basic service set identifier (BSSID)). Furthermore, upon identifying the captive portal domains, the systems and methods described herein may access collected on-demand data privacy telemetry to identify web tracking behaviors detected for the captive portal domains to detect a number of associated web trackers. Finally, the systems and methods described herein may determine a captive portal privacy score based on the number of web trackers and the level of risk (i.e., high, medium, or low) associated with each web tracker. By determining data privacy risks for captive portals in this way, the systems and methods described herein may provide users with privacy risks associated with identified web trackers (i.e., utilizing a visual indicator to represent a level of risk associated with using a particular captive portal) as well as identifying specific tracking actions (e.g., fingerprinting) performed by web trackers.

Figure 6:
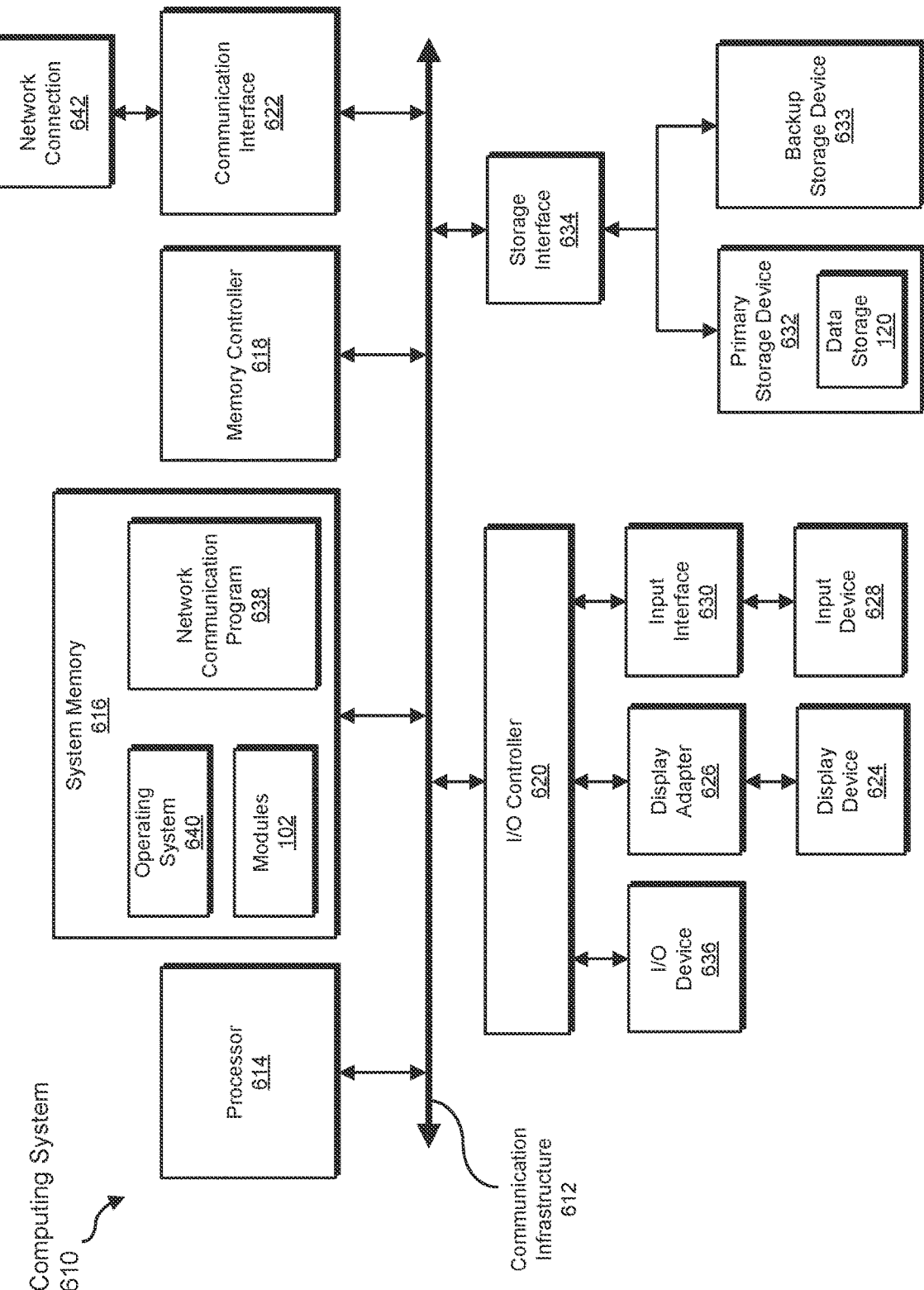
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
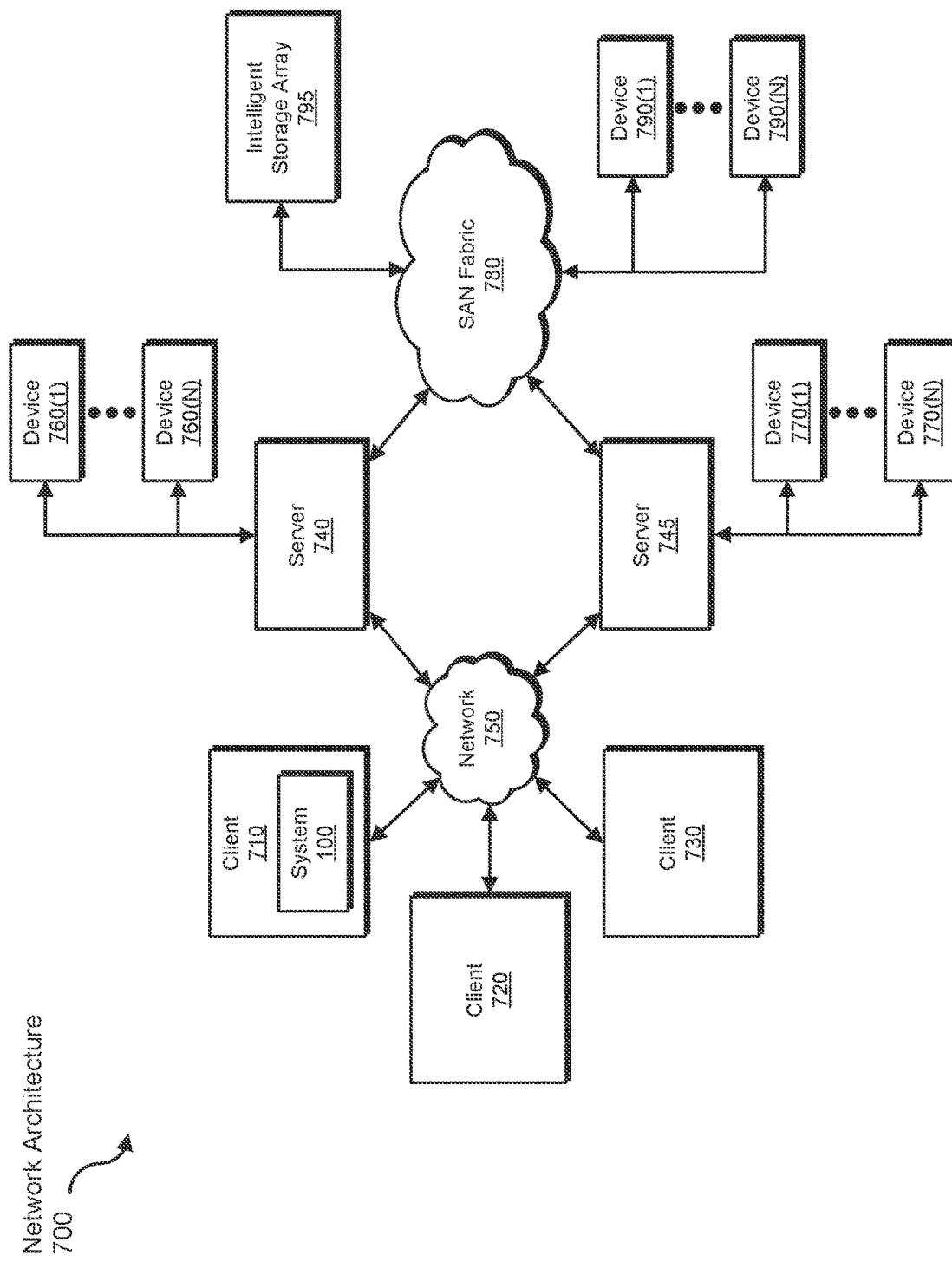
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting user data privacy against web tracking on Wi-Fi captive portals.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting user data privacy against web tracking on a captive portal, at least a portion of the method being performed by one or more computing devices comprising at least one processor, the method comprising:
    detecting, by the one or more computing devices, telemetry data generated from establishing a connection with a network access device associated with the captive portal;
    determining, by the one or more computing devices and based on the telemetry data, a target set of domains associated with a service set identifier assigned to the network access device;
    analyzing, by the one or more computing devices, web tracking behavior data associated with the target set of domains to identify web trackers on the captive portal for a dataset of potential users by:
        communicating a query for on-demand telemetry detected by a web tracking service on a security server;
        receiving, in response to the query, a group of web tracking behaviors exhibited by a candidate list of web trackers based on the on-demand telemetry; and
        classifying a set of the candidate list of web trackers appearing to a threshold number of the potential users as the web trackers;
    calculating, by the one or more computing devices, a privacy risk score associated with the web trackers on the captive portal; and
    performing, by the one or more computing devices, a security action that protects against a potential invasion of user data privacy by presenting a privacy risk score notification associated with the web trackers on the captive portal.

2. The computer-implemented method of claim 1, wherein detecting the telemetry data generated from establishing the connection with the network access device associated with the captive portal comprises:
    detecting a user connection to the network access device; and
    storing connection data and a corresponding timestamp received from the network access device as the telemetry data.

3. The computer-implemented method of claim 1, wherein determining, based on the telemetry data, the target set of domains associated with the service set identifier assigned to the network access device comprises:
    detecting a candidate set of domains in post-connection data requests to the service set identifier;
    filtering highly-accessed domains and domains externally loaded by third party resources from the candidate set of domains; and
    grouping one or more remaining domains in the candidate set of domains by another service set identifier for a wireless network utilized by another network access device to determine the target set of domains.

4. The computer-implemented method of claim 1, wherein the query comprises the target set of domains, a plurality of locations, and a timespan.

5. The computer-implemented method of claim 1, wherein calculating the privacy risk score associated with the web trackers on the captive portal comprises:
    determining a risk value for each of the web trackers based on the web tracking behavior data; and
    generating the privacy risk score based on a number of the web trackers sharing a common risk value.

6. The computer-implemented method of claim 1, wherein calculating the privacy risk score associated with the web trackers on the captive portal comprises adding the captive portal to a cluster comprising a plurality of captive portal groups.

7. The computer-implemented method of claim 6, wherein each of the captive portal groups is classified based on sharing a common privacy risk score.

8. The computer-implemented method of claim 1, wherein performing the security action comprises displaying a visual indicator corresponding to the privacy risk score.

9. The computer-implemented method of claim 1, wherein performing the security action comprises generating a warning describing web tracking behavior associated with the web trackers.

10. A system for protecting user data privacy against web tracking on a captive portal, the system comprising:
    at least one physical processor; and
    physical memory comprising computer-executable instructions that, when executed by the physical processor, cause the physical processor to:
        detect, by a detection module, telemetry data generated from establishing a connection with a network access device associated with the captive portal;
        determine, by a determining module and based on the telemetry data, a target set of domains associated with a service set identifier assigned to the network access device;
        analyze, by an analysis module, web tracking behavior data associated with the target set of domains to identify web trackers on the captive portal for a dataset of potential users by:

communicating a query for on-demand telemetry detected by a web tracking service on a security server;

receiving, in response to the query, a group of web tracking behaviors exhibited by a candidate list of web trackers based on the on-demand telemetry; and classifying a set of the candidate list of web trackers appearing to a threshold number of the potential users as the web trackers;

calculate, by a risk score module, a privacy risk score associated with the web trackers on the captive portal; and perform, by a security module, a security action that protects against a potential invasion of user data privacy by presenting a privacy risk score notification associated with the web trackers on the captive portal.

11. The system of claim 10, wherein the detection module detects the telemetry data generated from establishing the connection with the network access device associated with the captive portal by:

detecting a user connection to the network access device; and storing connection data and a corresponding timestamp received from the network access device as the telemetry data.

12. The system of claim 10, wherein the determining module determines, based on the telemetry data, the target set of domains associated with the service set identifier assigned to the network access device by:

detecting a candidate set of domains in post-connection data requests to the service set identifier;

filtering highly-accessed domains and domains externally loaded by third party resources from the candidate set of domains; and grouping one or more remaining domains in the candidate set of domains by another service set identifier for a wireless network utilized by another network access device to determine the target set of domains.

13. The system of claim 10, wherein the query comprises the target set of domains, a plurality of locations, and a timespan.

14. The system of claim 10, wherein the risk score module calculates the privacy risk score associated with the web trackers on the captive portal by:

determining a risk value for each of the web trackers based on the web tracking behavior data; and generating the privacy risk score based on a number of the web trackers sharing a common risk value.

15. The system of claim 10, wherein the risk score module calculates the privacy risk score associated with the web trackers on the captive portal by adding the captive portal to a cluster comprising a plurality of captive portal groups.

16. The system of claim 15, wherein each of the captive portal groups is classified based on sharing a common privacy risk score.

17. The system of claim 10, wherein the security module performs the security action by:

displaying a visual indicator corresponding to the privacy risk score; and generating a warning describing web tracking behavior associated with the web trackers.

18. A non-transitory computer-readable medium comprising one or more computer-executable instructions that, when executed by at least one processor of a computing device, cause the computing device to:

detect telemetry data generated from establishing a connection with a network access device associated with a captive portal;

determine, based on the telemetry data, a target set of domains associated with a service set identifier assigned to the network access device;

analyze web tracking behavior data associated with the target set of domains to identify web trackers on the captive portal for a dataset of potential users by:

communicating a query for on-demand telemetry detected by a web tracking service on a security server;

receiving, in response to the query, a group of web tracking behaviors exhibited by a candidate list of web trackers based on the on-demand telemetry; and classifying a set of the candidate list of web trackers appearing to a threshold number of the potential users as the web trackers;

calculate a privacy risk score associated with the web trackers on the captive portal; and perform a security action that protects against a potential invasion of user data privacy by presenting a privacy risk score notification associated with the web trackers on the captive portal.

19. The non-transitory computer-readable medium of claim 18, wherein detecting the telemetry data generated from establishing the connection with the network access device associated with the captive portal comprises:

detecting a user connection to the network access device; and storing connection data and a corresponding timestamp received from the network access device as the telemetry data.

20. The non-transitory computer-readable medium of claim 18, wherein determining, based on the telemetry data, the target set of domains associated with the service set identifier assigned to the network access device comprises:

detecting a candidate set of domains in post-connection data requests to the service set identifier;

filtering highly-accessed domains and domains externally loaded by third party resources from the candidate set of domains; and grouping one or more remaining domains in the candidate set of domains by another service set identifier for a wireless network utilized by another network access device to determine the target set of domains.

* * * * *